(12) United States Patent
Jurran

(10) Patent No.: US 12,377,444 B2
(45) Date of Patent: Aug. 5, 2025

(54) HOT WAX CLEANING DEVICE AND SYSTEM

(71) Applicant: SCHMITT PROF. MÖHLMANN & COLLEGEN WIRTSCHAFTSKANZLEI INSOLVENZVERWALTER AKTIENGESELLSCHAFT, Zwickau (DE)

(72) Inventor: Eric Jurran, Zwickau (DE)

(73) Assignee: SCHMITT PROF. MOHLMANN & COLLEGEN WIRTSCHAFTSKANZLEI INSOLVENZVERWALTER AKTIENGESELLSCHAFT, Zwickau (DE)

( * ) Notice: Subject to any disclaimer, the term of this patent is extended or adjusted under 35 U.S.C. 154(b) by 190 days.

(21) Appl. No.: 18/275,345

(22) PCT Filed: Jan. 31, 2022

(86) PCT No.: PCT/EP2022/052210
§ 371 (c)(1),
(2) Date: Aug. 1, 2023

(87) PCT Pub. No.: WO2022/162220
PCT Pub. Date: Aug. 4, 2022

(65) Prior Publication Data
US 2024/0131560 A1 Apr. 25, 2024
US 2024/0226964 A9 Jul. 11, 2024

(30) Foreign Application Priority Data
Feb. 1, 2021 (DE) .......................... 102021102243.6

(51) Int. Cl.
*B08B 1/14* (2024.01)
*B08B 5/00* (2006.01)
*B08B 7/00* (2006.01)
*B08B 7/04* (2006.01)
*B08B 13/00* (2006.01)
(Continued)

(52) U.S. Cl.
CPC .................. *B08B 1/14* (2024.01); *B08B 5/00* (2013.01); *B08B 7/0071* (2013.01); *B08B 7/04* (2013.01); *B08B 13/00* (2013.01); *B25J 11/0085* (2013.01); *B60S 3/04* (2013.01); *B08B 2220/01* (2013.01)

(58) Field of Classification Search
None
See application file for complete search history.

(56) References Cited

FOREIGN PATENT DOCUMENTS

DE 10329499 B3 8/2004
DE 202015104326 U1 9/2016
(Continued)

*Primary Examiner* — Rita P Adhlakha
(74) *Attorney, Agent, or Firm* — Brooks Kushman P.C.

(57) ABSTRACT

A device for the mechanical removal of wax residues on vehicle bodies, characterized by—a wax absorbing tape (1), —a supply spindle (2) for storing and for unwinding unused wax absorbing tape (1), —a press-on unit (5) for pressing the wax absorbing tape (1) onto a wax-soiled surface of the body of the vehicle, and—one or more motors for transporting the wax absorbing tape (1) from the supply spindle (2) via the deflecting reels (4) to the take-up reel (3), and—a control unit for controlling the advance of the wax absorbing tape.

17 Claims, 2 Drawing Sheets

(51) Int. Cl.
   *B25J 11/00*   (2006.01)
   *B60S 3/04*   (2006.01)

(56) References Cited

FOREIGN PATENT DOCUMENTS

| | | | |
|---|---|---|---|
| EP | 0341388 | A2 | 11/1989 |
| EP | 0341389 | A2 | 11/1989 |

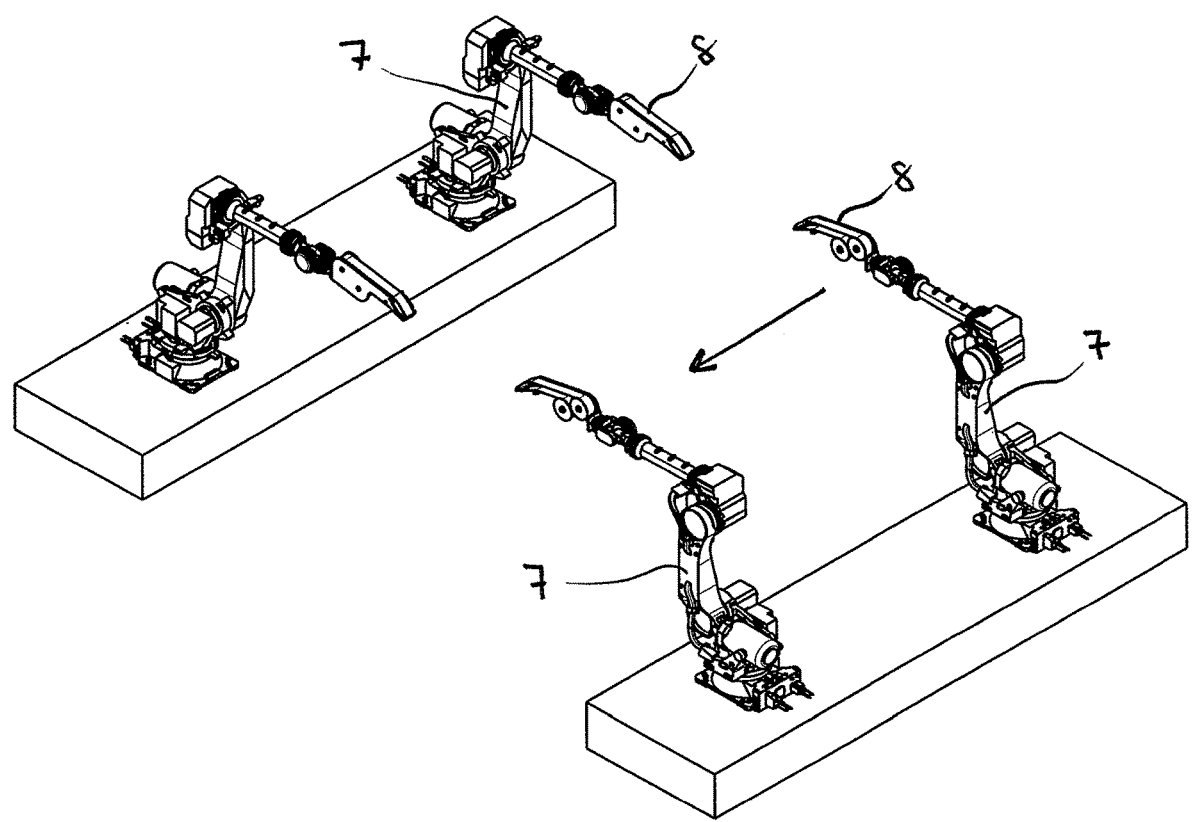

HOT WAX CLEANING DEVICE AND SYSTEM

CROSS-REFERENCE TO RELATED APPLICATIONS

This application is the U.S. national phase of PCT Application No. PCT/EP2022/052210 filed Jan. 31, 2022, which claims priority to German Application No. 102021102243.6 filed Feb. 1, 2021, the disclosures of which are hereby incorporated in their entirety by reference herein.

The invention relates to a device for mechanically removing wax residues from vehicle bodies and to a wax cleaning station comprising a plurality of robots each being provided with a cleaning device designed for the collection of the wax.

In the manufacture of motor vehicles, a wax-based cavity preservation is applied to the already painted vehicle body before the drivetrain parts and interior trim are installed. For this purpose, the wax is liquefied by heating, transported to the flooding points via pumps and injected into the body-in-white. Typically, all the cavities of the body-in-white are preserved in this manner to prevent the entry of moisture and subsequent corrosion. After flooding, excess wax drains out of the body shell, resulting in significant contamination, particularly on the sides of the vehicle bodies and in the floor area. Before further equipping the vehicle bodies, these contaminants have to be removed.

Usually, cleaning is performed mechanically by employees of the vehicle manufacturer. With the help of cleaning cloths, the body is wiped down by hand which is time consuming and laborious work, especially when the contaminating wax has already cooled down and solidified again.

The contamination is located in particular on the underbody, in the area of the sills, doors, tailgate and in interior areas of the vehicle. Work activities required for cleaning must be done in awkward working positions, such as overhead.

In view of this, it is desirable to automate these cleaning operations, i.e., without the need for labor-intensive manual work. It is thus the objective of the present invention to provide a device and a system that can perform this cleaning work and deliver acceptable results.

This objective is achieved with a device for the mechanical removal of wax residues from vehicle bodies, said device comprising
  a wax absorbing tape,
  a supply reel for stocking and unwinding unused wax absorbing tape,
  a take-up reel for used wax absorbing tape,
  Deflection reels for guiding the wax absorbing tape,
  a pressure unit for pressing the wax absorbing tape against a wax-contaminated surface of the body of a vehicle, as well as
  one or more motors for transporting the wax absorbing tape from the supply reel via the deflection reels to the take-up reel, and
  a control unit for controlling the feed operation of the wax absorbing tape.

It is expedient to combine such a device with a robot or robot arm that provides targeted guidance to the soiled body areas of the vehicle.

The device proposed by the invention comprises a wax absorbing tape to remove the wax residues from the car body. Such a wax absorbing tape, for example, consists of a strip-shaped fleece fabric several meters in length wound onto a supply reel, the tape being unwound from this supply reel as required. Spent wax absorbing tape is wound onto a take-up reel, which can be disposed of together with the spent wax absorbing tape it accommodates after the supply of unused wax absorbing tape has been exhausted.

For guidance of the wax absorbing tape, the device is provided with a plurality of deflection reels. As a rule, three deflection reels are sufficient to bring the wax absorbing tape into contact with the area to be cleaned and to guide it to the take-up reel. Contact is made by means of a pressure unit which is arranged between two deflection reels; by exerting slight pressure said pressure unit moves the wax absorbing tape against the vehicle body.

It is understood that the device claimed by the invention is provided with one or several motors for unwinding and/or winding the wax absorbing tape from or onto the reels, as well as a control unit for controlling the feed operation of the wax absorbing tape. The control operation is usually based on the frequency of vehicle bodies passing the device, so that a certain length of wax cleaning tape is unwound per vehicle body.

As a rule, the device comprises two synchronous motors for unwinding and winding the wax absorbing tape from the supply reel and onto the take-up reel.

The device conveniently is provided with an interface for adaptation to a robot. Purpose of the robot is to move and guide the device towards the soiled areas of the vehicle body, as will be explained in more detail hereinafter.

The device may be provided with one or several sensors that control the unwinding and rewinding of the wax absorbing tape as determined by its degree of contamination. However, automated unwinding/rewinding is preferred depending on the number or frequency of vehicle bodies passing by.

The pressure unit of the device proposed by the invention is expediently arranged between a first and a second deflection reel. The pressure unit is preferably configured so as to be flexible, for example provided in the form of a cushion, which has the required adaptability to the respective car body design. This ensures the wax absorbing tape makes sufficiently close contact with the contaminated surfaces. For this purpose, a cushion filled with a liquid or gel is particularly suitable.

Good flexibility of the pressure unit is essential. In particular, flexibility can be achieved by the pressure unit consisting of a cushion that offers a certain degree of resilience and is capable of pressing the wax absorbing tape against the respective part or portion of the body. This can be achieved by filling such a cushion with a gel, gas, liquid or foam material. The gels employed in this context can be conventional gels, for example based on water or polyglycols with commonly used thickeners. Water and polyglycols can also be used as liquids.

Suitable gases that may be used are in particular air and nitrogen. Suitable foams, for example, include those based on polyurethanes. Integral soft foams are also suitable.

In the case of a gas-filled cushion, such as an air cushion, it may be provided with a valve to allow air to be introduced or released. This can also take place automatically via a line integrated into the device, which allows the air pressure to be controlled as a function of the particular requirements to be met with respect to the body configuration.

Suitable materials for the cover of the cushion are common plastics that offer the required impermeability and strength. Examples for this include polyalkylenes and polyurethanes, for the latter especially those known under the brand name of Cellasto.

With a view to compensating for tolerances that may result, for example, from different models of the vehicles, but also from the means of transport—as a rule, vehicle bodies are moved to the individual stations suspended from a rail system—it is expedient to mount the pressure unit on springs.

It is advisable to monitor the cleaning operation with a camera. For this purpose, the device arranged on a robot is linked to a camera that, on the one hand, is capable of identifying soiled areas or spots and thus guiding the robot with the device to these areas in a targeted manner, and, on the other hand, monitoring the cleaning result and continuing the cleaning activity until the soiling is successfully removed.

The invention further relates to a cleaning station for motor vehicles for the removal of wax contamination resulting from cavity sealing, comprising a plurality of robots each provided with a cleaning device in accordance with the invention for the collection of the wax and a camera for controlling and monitoring the cleaning operation. Such a cleaning station is provided as a separate station within the transportation route of the vehicle bodies, usually immediately downstream of the station where preservation of the vehicle body cavities takes place. The vehicle bodies are compulsorily passed through the cleaning station and checked via the camera to monitor the contamination situation. When wax soiling is identified, the camera activates the associated robot for the purpose of removing the wax contamination.

The robots of the cleaning station are preferably located to the side of the transportation line of the vehicle bodies. As a rule, two robots arranged on each side are sufficient. If considered necessary, an additional robot can be mounted underneath the traversing path of the body for the purpose of cleaning the underbody. The cleaning devices are mounted on the robot arms in a pivotable manner. Another robot can be arranged below the vehicle body for cleaning the underbody.

Especially if the cleaning station is located at some distance from the station where cavity preservation takes place, it may be useful to link the cleaning device to a hot-air nozzle so that already solidified wax can be remelted. Such a hot-air nozzle is expediently arranged in front of the cleaning device in the vehicle body's transporting direction and emits air at an angle, i.e., obliquely onto the soiled area of the body and in the direction of the cleaning device. This enables the reheated and liquefied wax to be driven towards the cleaning device where it is absorbed by the cleaning tape.

In the interest of achieving a continuous operation of the cleaning device, it is advisable to equip the robots with a quick-action coupling system that permits the respective cleaning device to be automatically replaced with a new one when the wax absorbing tape is exhausted. Such quick-action coupling systems and replacement capabilities are known and have been described many times.

The invention is explained in more detail by way of the enclosed figures, where

FIG. 2 shows a cleaning station comprising four robots, each of which being provided with a hot wax cleaning device.

Figure 1:
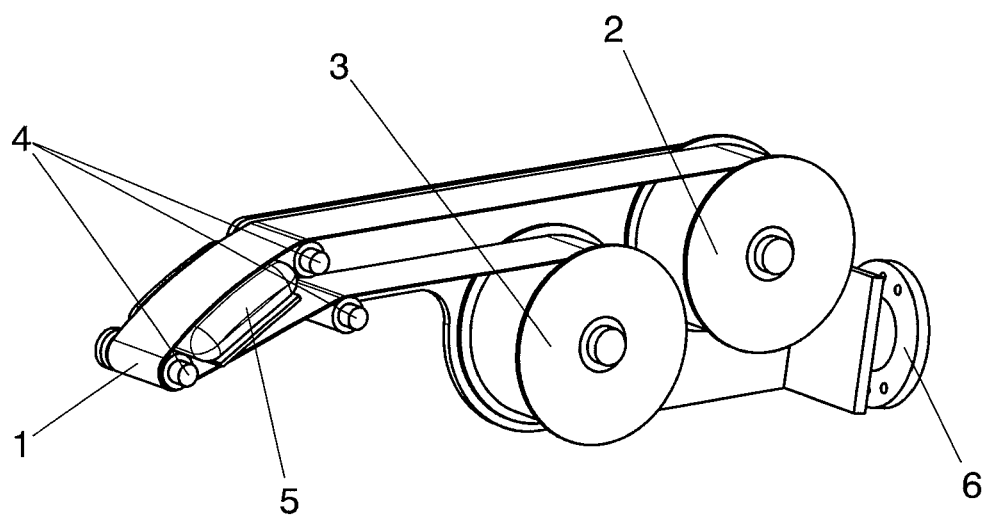
FIG. 1 shows a hot wax cleaning device according to the invention.

The hot wax cleaning device according to FIG. 1 comprises a wax absorbing tape 1 which is unwound from a supply reel 2 and wound onto a take-up reel 3 after use. The wax absorbing tape 1 passes over three deflection reels 4, of which the middle or second one reverses the direction of movement of the wax absorbing tape 1 towards the take-up reel 3. Between the first reel 4 and the middle reel 4, a pressure cushion 5 is arranged underneath the wax absorbing tape 1, over which the wax absorbing tape 1 passes, said cushion being suitable for pressing the tape against the contaminated areas or spots of the vehicle body. Expediently, the cushion is spring-mounted to enable model-related or transport-related tolerances to be compensated. A coupling system 6 allows the cleaning device to be secured to a robot arm.

In order to make the cushion 5 flexible and achieve its soft and smooth contact with the surface of the car body, it is expediently filled with a gel, gas or liquid. It is advisable for the cushion to have a smooth, impermeable surface and be made of a plastic material, such as polyethylene.

In FIG. 2 a wax cleaning station for motor vehicles is illustrated that has 4 robots 7 arranged laterally of the traversing path of the vehicle bodies (shown by the arrow). Each of the robots 7 is equipped with a device proposed by the invention for the removal of wax residues 8 and, not shown, is equipped with or linked to a camera for monitoring the cleaning operation. The devices 8 are mounted on the robots 7 in such a way that they can swivel in all directions and can be replaced by means of a quick-action coupling.

The invention claimed is:

1. Device for the mechanical removal of wax residues from vehicle bodies, characterized by
   a wax absorbing tape (1),
   a supply reel (2) for stocking and unwinding of unused wax absorbing tape (1),
   a take-up reel (3) for used wax absorbing tape (1),
   deflection reels (4) for guiding the wax absorbing tape (1),
   a pressure unit (5) for pressing the wax absorbing tape (1) against a wax-contaminated surface of the body of a vehicle, as well as
   one or more motors for transporting the wax absorbing tape (1) from the supply reel (2) via the deflection reels (4) to the take-up reel (3), and
   a control unit for controlling the feed operation of the wax absorbing tape (1).

2. Device according to claim 1, characterized by an interface (6) for adaptation to a robot.

3. Device according to claim 1, characterized by two synchronous motors for unwinding and winding the wax absorbing tape (1) from the supply reel (2) and onto the take-up reel (3).

4. Device according to claim 3, characterized by one or several sensors that control the unwinding and rewinding of the wax absorbing tape (1) as determined by the degree of contamination.

5. Device according to claim 3, characterized in that unwinding and rewinding of the wax absorbing tape (1) are controlled depending on the number of cleaned vehicle bodies.

6. Device according to claim 1, characterized by three deflection reels (4) for guiding the wax absorbing tape (1).

7. Device according to claim 6, characterized in that the pressure unit (5) is arranged between two deflection reels (4).

8. Device according to claim 1, characterized in that the pressure unit (5) is a cushion.

9. Device according to claim 1, characterized in that the pressure unit (5) consists of a flexible material which is filled with a gel, gas or liquid to enable adaptation to the surface to be cleaned.

10. Device according to claim 1, characterized in that the pressure unit (5) is mounted on springs to compensate for tolerances.

11. Wax cleaning station for vehicle bodies comprising a plurality of robots each being provided with a cleaning device according to claim 1 for absorbing wax, as well as a camera for controlling and monitoring the cleaning operation.

12. Wax cleaning station according to claim 11, characterized by 4 robots arranged to the side of the transport route of the vehicle bodies to be cleaned.

13. Wax cleaning station according to claim 11, characterized in that each robot is equipped with a hot air nozzle.

14. Wax cleaning station according to claim 13, characterized in that the hot air nozzles are arranged ahead of the cleaning devices in the transporting direction of the vehicle bodies.

15. Wax cleaning station according to claim 14 characterized in that the hot air nozzles are directed at an angle towards the vehicle bodies and the cleaning device.

16. Wax cleaning station according to claim 11, characterized by a robot arranged underneath the vehicle body.

17. Wax cleaning station according to claim 11, characterized in that each robot is equipped with a quick-action coupling via which the cleaning device is replaced.

* * * * *